H. S. GAY & E. W. DUKE.
DEVICE FOR PRODUCING IMAGES.
APPLICATION FILED APR. 16, 1913.
1,146,323.
Patented July 13, 1915.
2 SHEETS—SHEET 1.
Fig. 1
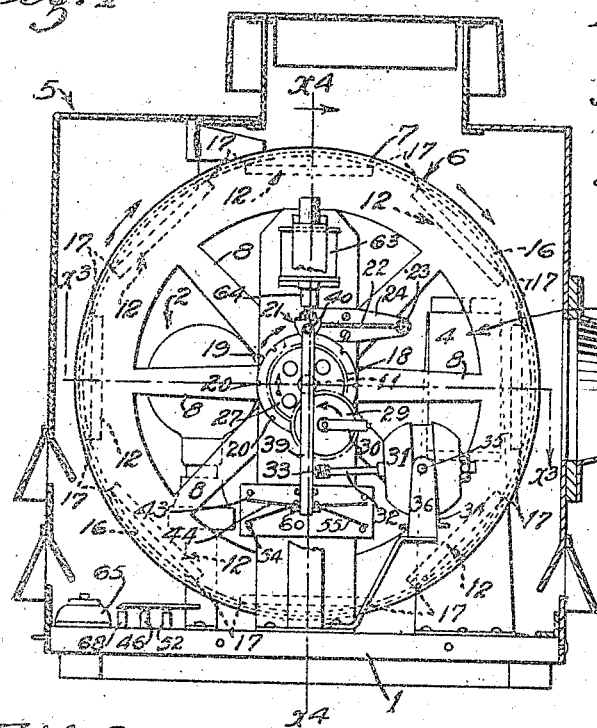
Fig. 5
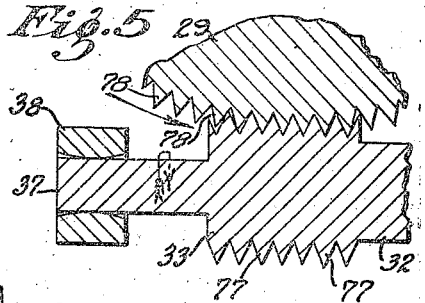
Fig. 6
Fig. 2
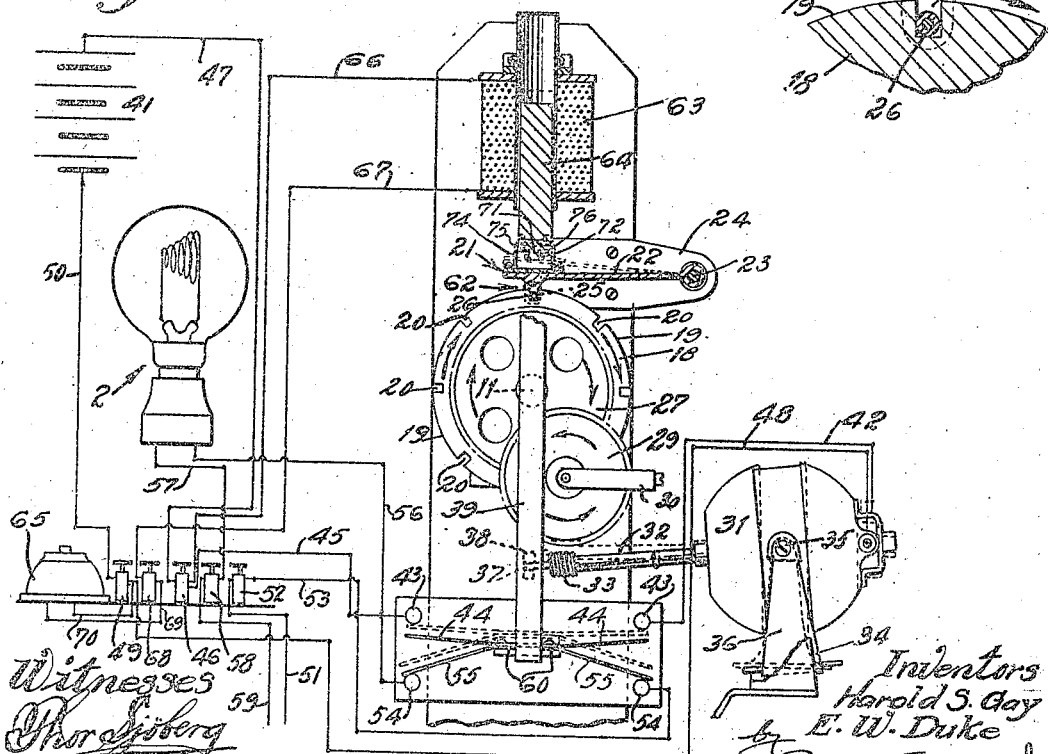
Witnesses
Thor Sjöberg
L. Belle Weaver
Inventors
Harold S. Gay
E. W. Duke
by James R. Townsend
their atty.

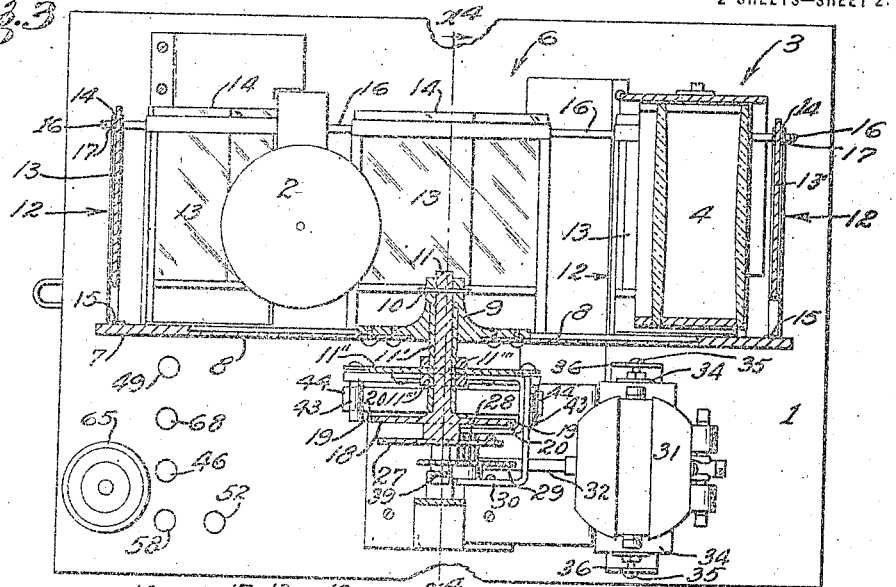
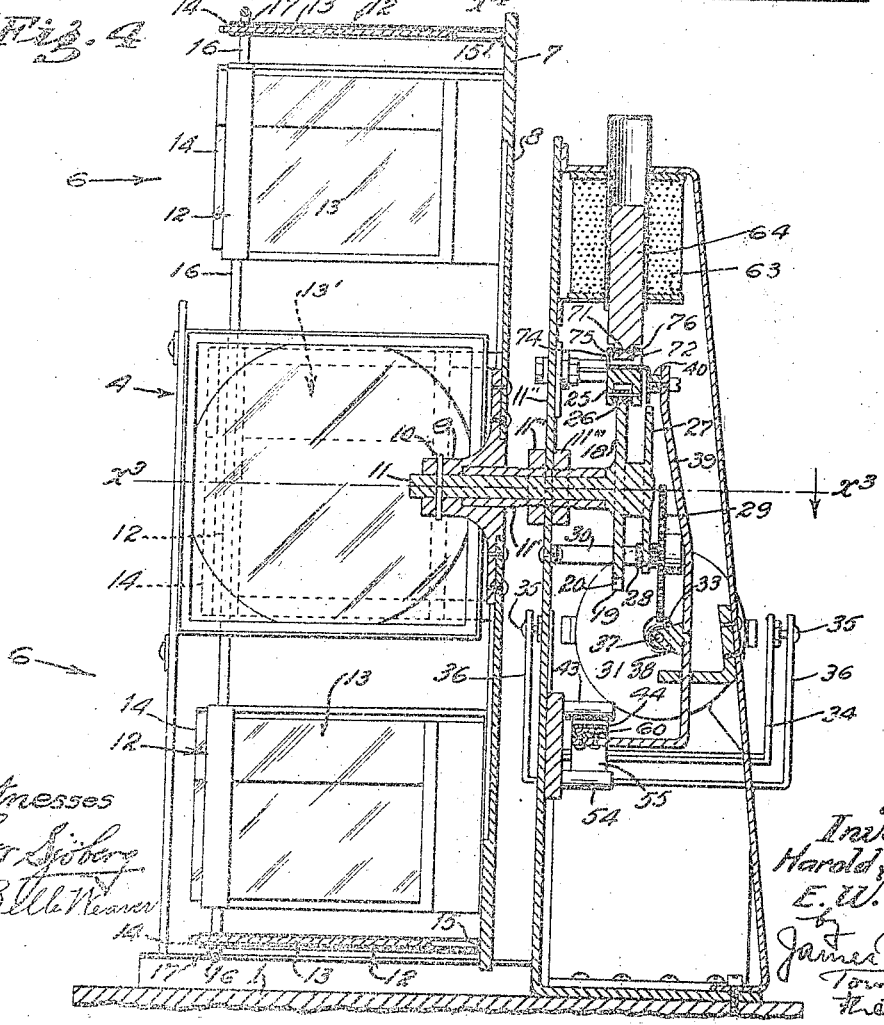

UNITED STATES PATENT OFFICE.

HAROLD S. GAY AND ELZA W. DUKE, OF LOS ANGELES, CALIFORNIA, ASSIGNORS TO STEREO-ANNUNCIATOR CO., A CORPORATION OF CALIFORNIA.

DEVICE FOR PRODUCING IMAGES.

1,146,323.  Specification of Letters Patent.  Patented July 13, 1915.

Application filed April 16, 1913. Serial No. 761,629.

*To all whom it may concern:*

Be it known that we, HAROLD S. GAY and ELZA W. DUKE, citizens of the United States, residing at Los Angeles, in the county of Los Angeles and State of California, have invented new and useful Improvements in Devices for Producing Images, of which the following is a specification.

This invention relates to devices for producing images on screens, and in view of it such devices when equipped as hereinafter generally described may be used to perform functions that have not hitherto been satisfactorily and conveniently performed. For instance, such a device when embodying this invention is very well adapted to perform the following valuable service in connection with an ordinary moving picture outfit: A series of slides may be supplied to the device, each slide containing some suitable information such as the title or other notes concerning a certain scene to be exhibited by the moving picture outfit, while each slide may also contain information in the nature of publicity advertisements for local stores, etc., or may contain any other desirable matter. The device is placed at any suitable point and focused so that the image of a certain slide will be produced on a screen in full view of the audience. Such image may, of course, be cast at any suitable point, but it is preferable to cast it immediately beside the main image of the moving picture machine, it being understood that one particular slide corresponds with one particular moving picture and should preferably be displayed during the whole period in which that moving picture scene is being run. In this event persons witnessing the moving picture scene may conveniently glance over at the image of the slide and may refresh their memory as to the title of the main picture, or as to any other notes carried by said slide and concerning same. Or else persons joining the audience after the main picture has commenced may glance at the image of the slide and may therefrom inform themselves as to the title and other notes, which will render the scene more interesting and pleasurable. Other advantages to be derived by the continued presence of the notes of the main picture may readily suggest themselves according to the variable dispositions of different persons in the audience; but the commercial advantages secured by a tactful display of the advertising matter in connection with said notes are also of very great advantage and provide a lucrative revenue to those owning said advertising space.

The devices embodying this invention, broadly as hereinafter described are admirably adapted for the above service especially in view of certain characteristics such as the following: The device, of course, contains means for successively interposing the several slides into position so that the image of each may be cast on the screen when the corresponding moving picture is about to be displayed. The operation of interposing the next succeeding slide is performed automatically after said operation is once started; and for the purpose of starting said operation and setting the proper elements of the device into motion this invention contemplates manually-operated or controlled means such as a push-button and other accessories in an electric circuit for starting the aforesaid operation at will. In view of such an arrangement the device may be positioned at any suitable point either in the operating booth of the moving picture outfit, or else at some point remote from same and nearer to the screen whereon the image is to be cast. In the latter event, a comparatively weaker light will be adequate to the purpose, but in either event the aforesaid push botton in the controlling circuit will be located in the aforesaid operating booth. When the operator, therefore, is about to commence the display of the next subsequent moving picture he need merely operate said push button or other means provided for the purpose; and as heretofore stated this will result automatically and without further attention on the operator's part in the display of the next subsequent slide which properly bears the notes relative to said moving picture.

Though other advantageous and novel features may appear in consideration of the detailed description hereinafter set forth, or by inspection of the accompanying drawings, it may be well at this point to refer particularly to another basic feature of the invention, whereby increased emphasis is attracted to the image produced by the device. When the operator touches the push button for the purpose of starting the next subsequent slide into its active position the device operates to simultaneously and automatically cut off its own light from the screen, so that during the change of slides and images the screen is totally dark at that point where the image of the slide is to be cast. When the next subsequent slide attains its proper active position certain elements in the device automatically coöperate to again cast the light rays onto the screen, so as to suddenly flash a complete image into view before the audience. By thus impressing said relatively bright image on a portion of the screen which was previously dark, considerable attention is attracted to its contents, and the advertisements contained therein are correspondingly emphasized with obvious benefit, both to the public and to advertisers.

Though the foregoing remarks illustrate one of the more prominent forms of service which this invention is calculated to meet, it will be understood that devices equipped with the broad and novel features hereinafter set forth may be used for a variety of purposes, among which the following deserves particular mention: A public lecturer using stereopticon views for illustrating his talk may, before commencing his lecture, suitably arrange his slides within the device, and may draw the aforesaid electrical controlling circuit, and push button therein, up to the platform from which he intends to speak. After suitably focusing the lens and commencing his lecture he need merely operate the push button each time he wishes to display the next subsequent picture. By this means the need of an assistant is altogether obviated and the lecturer has complete control over the length of time during which a certain picture is displayed, and over the particular time at which the picture is changed for the one next subsequent.

In order to adapt the device for the various forms of service which it may be called upon to perform certain mechanic's changes may be found necessary or desirable in the device as hereafter described, but such changes will be found to lie broadly within the spirit of this invention, and need not therefore be specifically pointed out.

The accompanying drawings illustrate the invention.

Figure 1 is a side elevation of a device embodying this invention; the hood being shown in longitudinal section. Fig. 2 is an enlarged detail view, partly in section, and shows parts of the operating mechanism in the device. Certain electrical connections are shown diagrammatically in this view. Fig. 3 is a plan section on line $x^3$, Fig. 4, of the device embodying this invention. Fig. 4 is a transverse section on line $x^4$, Fig. 3, of the device embodying this invention. Fig. 5 is an enlarged sectional view showing a fragment of the operating mechanism. Fig. 6 is an enlarged sectional view showing another fragment of the mechanism.

In the form of the device as shown in the figures, it is seen to comprise the usual base 1, Fig. 1, suitable light-producing means 2, suitable focusing means 3 including a standard condenser 4, and a hood 5. The light-producing means 2 is illustrated as being an incandescent electrical lamp, though many other forms of light-producing means may, of course, be substituted; and the rays from said light pass through, and are for[...] the screen by said means 3 in the [...] manner. For the purpose of successively and automatically interposing slides in the path of the light rays that pass through said focusing means some sort of slide-carrying means should be provided, and one practical form of such means is a drum hereinafter generally referred to by numeral 6, its details being best discerned by inspection of the Figs. 3 and 4. Said slide-carrier or drum 6 may have a supporting structure comprising members, such as the annular disk 7, spokes 8 and hub 9, the latter being rigidly connected, as by pin 10, Fig. 4, to a rotatably mounted shaft 11, whereby the whole slide-carrier itself is rotatively supported. In this connection it will be noticed that the shaft 11 is supported by a sleeve-bearing 11′, Figs. 3 and 4, which bearing in turn is locked onto the supporting standard 11″ by means of lock-nuts 11‴. It will be also noticed that said slide-carrier includes a series of peripherally-arranged slide-holders 12 for holding a series of slides 13; and each slide-holder has its plane extending substantially parallel to the axis of the slide-holder, the said axis lying in line $x^3$, Fig. 4 and in line $x^4$, Fig. 3; while each slide-holder is also open at one side, as at 14, for the reception of the slides 13. With such a construction the slide-holders practically constitute the body or periphery of the slide-carrier and they may be supported by soldering, or otherwise attaching, one side of said holders to the disk 7, as at 15, Fig. 4, and by soldering, or otherwise attaching, the other side of said holder to a reinforcing wire in the form of a ring 16, as at points 17, indicated in Figs. 1, 3 and 4. In this sense the slide-carrier is seen to be practically drum-shaped, the slide-holders being arranged around, and substantially constituting, the periphery of said drum. Such an arrangement is found convenient and practical, both because of the ease and facility with which the slides may be mounted on same, and also because of the facility with which the light-producing means 2 and the condenser 4 may be arranged within said drum.

When a certain slide is positioned immediately before the condenser, as at 13′, Fig.

3, and so as to be interposed in the path of the light rays that pass through the focusing means, said slide may be said to occupy its active position, because it will be its image that is cast upon the screen when the light-producing means is in operation. The slide, of course, may contain any suitable information as has been hereinbefore set forth; but if the device is used for lecturing purposes the slide contains the stereopticon views, etc., in which event it is preferable that the slides and slide-holders be relatively smaller than those shown in the figures, so that a greater number of slide-holders can be provided on the slide-carrying means, and a larger collection of slides charged into the device.

In order that the operator, after having exhibited a certain slide, may be able to operate said slide-carrier so as to carry the next slide into interposed position in the path of the light rays, certain mechanism, now to be described, is provided; and it will be noticed that the operation of said mechanism is automatic after such operation is once started. One form of mechanism, which satisfactorily accomplishes this function, is shown in the figures to include a wheel 18 having a circular periphery 19 with notches 20, Figs. 1 and 2, cut therein. This wheel 18 is shown to be integrally constructed with the shaft 11, Fig. 4, though any other mode for operatively connecting said wheel and shaft will be satisfactory, it being only necessary that the connection between said wheel and said slide-carrying means 6 be positive, so that the rotation of the latter shall be controlled by the rotation of the former.

A finger generally indicated by number 21, and best illustrated in Fig. 6, is preferably secured on an arm 22, Fig. 2, the latter being pivotally mounted on a pin 23, which extends from the rigid supporting bracket 24. The tip 25 of said finger is provided with an anti-friction roller 26, and is thereby well-adapted to ride upon the periphery of said wheel and to normally drop, or otherwise move, into the notches 20 thereof, in which position said finger arrests or blocks the rotation of said wheel and thereby arrests and blocks the rotation of the slide-carrying means 6. The notches 20 are so timed with respect to the finger-roller 26 that the slide-carrier's rotation is arrested when each slide-holder 12 is successively brought into active position exactly before the condenser 4.

For the purpose of driving the wheel 18 and shaft 11 the figures illustrate gearing, which includes a main gear 27 operatively connected with wheel 18, and said gear 27 is driven by a pinion 28, Fig. 4, which in turn is operatively connected with another gear 29, said pinion and gear, 28 and 29, respectively, being rotatively supported on tne arm 30 extending from the standard 11''. In addition to the gearing just described, the means for driving the wheel 18 and the slide-carrying means also includes means for driving the gearing, and this latter means includes the electrical motor 31 having a shaft 32 and the worm gear 33, the said worm gear being adapted to mesh and coöperate with gear 29 for driving the same. For reasons, hereinafter described, it is preferable that said gear 33 be capable of ki- - ing itself out of mesh with gear 29; and one mode of accomplishing this purpose is to mount the shaft 32, which carries gear 33 so that said shaft shall be movable. This mounting is accomplished in the construction shown by supporting motor 31 on a swinging base 34, which in turn is pivotally carried by pins 35 on the rigid standard 36. The extremity 37 of shaft 32, Figs. 2 and 4, runs in a bearing block 38 on the arm 39, the latter being operatively connected with finger 21, as at 40, Fig. 4. By means, operable at the will of the operator and which means will hereinafter be particularly described, the finger 21 is withdrawn from the notches 20 of wheel 18, and through the motion of said finger said means simultaneously operates to raise arm 39 and shaft 32 and to thereby throw worm gear 33 into mesh with gear 29.

The electric motor 31 is driven by electric power from any suitable source such as the battery 41, Fig. 2; and the two branches of the circuit for said motor are diagrammatically shown in Fig. 2, the first of said branches including wire 42, switch buttons 43, switch bar 44 and wire 45 leading to binding post 46, from which wire 47 leads to battery 41; while the second branch of said circuit includes wire 48 leading to the binding post 49 from which wire 50 completes the circuit back to the battery. In addition to the wiring just described, a second circuit for the light-producing means 2 should be provided; and one branch of this circuit includes wire 51 leading from some commercial lighting circuit, not shown in the figures, to the binding post 52, and said branch also includes wire 53, switch buttons 54, switch bar 55 and wire 56 leading to the light-producing means; while the second branch of said circuit includes wire 57 extending from said light-producing means to binding post 58, and wire 59, which completes the circuit back to the commercial lighting circuit, not shown. In considering the foregoing circuits for the light-producing means 2 and for the driving motor 31, it will be seen that the switch bars 55 and 44 in said circuits, respectively, are operatively connected, as at 60, Fig. 2, to the arm 39; and that the setting and form of said switches are such that the lighting circuit and the motor circuit cannot both be simultaneously closed. On this account when finger 21 is withdrawn from a notch 20 in wheel 18, and the arm 39 is consequently and simultaneously moved upward, the switch bar 44 will close the motor circuit across buttons 43 and will thereby start the driving motor 31. At this time, and as a result of said motion of arm 39, the worm gear 33 will be meshing with gear 29, as has been hereinbefore described, and the rotation of said motor and worm gear will be transmitted through gear 29, pinion 28 and gear 27 to the wheel 18 and to the slide-carrying means 6, successively. Anti-friction roller 26 of the finger 21, being withdrawn from notch 20 during this time, may roll upon the circular periphery 19 of the wheel 18, and said circular periphery will serve to support said finger along with arm 39 in its raised position, and will, therefore, continue to hold worm gear 33 in mesh with gear 29, and the switch bar 44 in contact with buttons 43, until the next succeeding notch 20 reaches a position beneath anti-friction roller 26. During the active period, which has just been described, and which commenced at the instant when finger 21 was withdrawn from notch 20, it will be seen that the slide-carrying means was being operated so as to bring the next subsequent slide into active position before the condenser 4; and it will also be seen that during this period the switch bar 55 was raised off switch buttons 54, so that the circuit for light-producing means 2 was open, whereby said light-producing means was inactive, and whereby its light rays were automatically cut off from the focusing means and from the screen during said period. On the other hand when the next succeeding notch 20 reaches a position immediately beneath the anti-friction roller 26, the latter is released from the supporting action of the peripheral shoulder 19, and said anti-friction roller will therefore drop automatically into the adjoining notch. Thereby the rotation of the wheel 18 and the slide-carrying means 6 will be arrested. At this instant the next succeeding slide will have reached its active position, and being exactly arrested there by the aforesaid action of roller 26, the latter element of finger 21 is seen to accomplish substantially the function of a brake for that system of parts, including the slide-carrying means 6, the wheel 18 and the gearing ending with gear 29. As the finger 21 moves into notch 20 the arm 39 will be lowered correspondingly, and this will result in a three-fold action as follows: first, the swinging of shaft 32 and worm gear 33 into the position shown by the full lines in Fig. 2, in which position said worm gear is out of mesh from gear 29; second, the removal of switch bar 44 from across the switch buttons 43, which causes the motor circuit to be opened and which ultimately results in the cessation of the motor's rotation after the momentum of the motor parts is exhausted; and third, the closing of switch bar 55 across the switch buttons 54, which causes the circuit for the light-producing means 2 to be closed, and which causes light rays from same to suddenly flash through the new slide so as to suddenly cast the image of same into view before the audience.

Among other advantages resulting from the foregoing arrangement the following may be mentioned particularly: By unmeshing worm gear 33 from gear 29 at substantially the same instant when the anti-friction roller 26 passes into the notch 20 the braking action of finger 21 is greatly facilitated, it being merely necessary to resist and overcome the momentum of the gearing, of wheel 18, and the slide-carrying means. These parts are relatively light and their rotary speed comparatively slow, so that the momentum to be overcome by the finger is considerably less than would be encountered if the relatively heavy and rapidly revolving armature of motor 31 were to cast its momentum against gear 29, and ultimately against finger 21. The momentum of the motor armature would be so transmitted against the finger if worm gear 33 were at this time meshing with gear 29, but these parts being unmeshed and the motor circuit being simultaneously open across buttons 43, the motor armature is allowed to spin freely and to dissipate its momentum against the resistance of its own bearings, etc. In this regard attention may also be especially directed to the bracing of finger 21, which, in the form of apparatus shown in the figures, is accomplished by mounting said finger on the pivoted arm 22. When roller 26, therefore, passes into a notch 20, the aforesaid momentum will be cast against the finger in the direction of arrow 62, Fig. 2, and the thrust produced by said momentum will be adequately resisted by the direct reaction of arm 22. This prevents the finger being abnormally bound and held in the notch, and makes it quite certain that a small force even would be sufficient to withdraw finger 21 from said notch.

We will now describe one suitable form of manually-operated means whereby the finger is withdrawn from the notch 20, so that the operation of the mechanism hereinbefore set forth may be started at the will of the operator. This form of means includes an electro-magnet 63, a movable plunger 64 operated by said electro-magnet, an electric circuit for said electro-magnet, and a switch, preferably in the form of a push-button 65, in said electric circuit. One branch of the electric circuit just referred to comprises the wire 66, binding post 46, and wire 47 leading to the battery 41; while the second branch of said circuit comprises wire 67, binding-post 68, wire 69 leading to the push-button 65, wire 70, binding-post 49, and wire 50, the latter completing the circuit back to battery 41.

As has been hereinbefore suggested the electric circuit just described may be of any length suitable to the particular mode in which the device is to be used. If it is used for lecturing purposes, for instance, the device may be set back from the screen to the proper focusing distance, and the wires just described may be of such length that push-button 65 may be handled by the lecturer while standing on the speaker's platform.

The plunger 64 may, of course, be made to operate finger 21 by any suitable arrangement, but a connection broadly resembling the following possesses certain advantages hereinafter set forth. This connection is best understood by reference to Fig. 6, where the plunger 64 is seen to be formed with an elongated neck 71 having a collar 72, and an annular striking face 73. Finger 21 is equipped with a suitable strap 74, which carries a slot or other proper aperture 75 through which neck 71 passes. When the electric current is allowed to flow in the electro-magnet 63, the movable plunger 64 will be drawn up into said electro-magnet in accordance with the well-known elementary laws of electro-magnetism. There having been an appreciable clearance 76 between the striking face 73 and strap 74, the electro-magnet will at the start lift the plunger against its own weight only, and will thereby cause the motion of said plunger to be accelerated. On this account, the plunger velocity will be appreciable after the plunger has moved upward sufficient to erase clearance 76, and in view of this the face 73 will strike or impact against the upper part of strap 74, and will jar or shock same sufficiently to lift finger 21 out of the notch 20, even though said finger may be slightly bound in said notch. As a result of this slight shock or jar the finger and arm 22 will ordinarily acquire an upward motion, and the electro-magnet 63 need merely continue said upward motion instead of being called upon to start said parts from rest against the standing friction of same. In view of an arrangement such as this, the electro-magnet need not have such great capacity and the withdrawal of the finger from the notch will be more certain; but, it will be understood, of course, that extensive modifications or changes may be made in the particular form of connection between the plunger and finger without departing from its spirit, it being merely necessary that said plunger be so related to said finger that the former may strike or tap the latter before commencing its true lifting action.

Another advantage in the operation of the foregoing construction may now be especially pointed out. Though the following situation should never arise, it may still, through unforeseen reasons, happen that while the aforedescribed mechanism is operating to move the slide-carrying means so that a new slide may be brought into active position; and consequently, while the finger 21 is not engaging a notch 20, the said finger or parts supporting same may become hung or bound slightly, so that the finger would fail to pass into the next notch 20 which would come into registering position. Should this happen the mechanism might continue to operate the slide-carrying means so as to pass one or more of the slides by the active position without stopping them there, in which event, of course, their pictures would be skipped. To prevent this, the worm gear 33 is formed and mounted in such manner that it will constantly tend to kick itself out of mesh with the gear 29. For this purpose said worm gear is preferably formed with V-shaped threads 77, Fig. 5, which during operation have an efficient wedging action against the corresponding V-shaped teeth 78 of gear 29; and on account of this wedging action the worm gear 33 will tend to constantly push itself downward and out of mesh with the gear 29. This downward thrust is imparted to and resisted by the arm 39, and the latter element, being operatively connected with the finger 21, will impart said downward thrust to said finger. By this means any ordinary sticking or binding action which may tend to hold the finger in its raised position will be overcome; it being understood, however, that this surplus force, impressed upon the finger by arm 39, is merely additional to the gravitational effort of the finger itself, of arm 22, and of the plunger 64, which gravitational effect is ordinarily sufficient to drive the finger into the notch.

From the foregoing detailed description, it is believed that the construction of the device will be clear, and it will be understood that the lecturer, moving picture operator or any other person using the device, need merely press push-button 65, which may be located at any point remote from the device, and that such operation of the push-button will result in setting the mechanism hereinbefore described into operation whereby the next succeeding slide will ultimately be brought into active position before the condenser. Whether or not the light-producing means shall be active or inactive during the period in which the slides are being changed may depend upon the particular judgment or choice of the user, but in certain cases the extinction of the light during said period may result in valuable advantages as hereinbefore set forth.

In the foregoing description of the invention and in the appended claims, it is understood, of course, that the terms "slide", "slide-carrier", etc., are not to be considered as limited to separate slides made of glass but that said term has been used broadly in this application to define any exhibit whatsoever, regardless as to whether the same is carried on separate pieces of glass or on separate, attached or continuous gelatin films, etc.

We claim:—

1. In a device for producing images on a screen, light-producing means, focusing means for the rays of said light producing means, slide-carrying means for successively interposing slides in the path of said light rays that pass through said focusing means, mechanism adapted to operate said slide-carrying means, said mechanism including a wheel having a notched periphery, means for rotatively driving said wheel, a finger adapted to ride upon the periphery of said wheel and to move into said notches thereof, said finger being adapted to arrest the rotation of said wheel when said finger is located in said notches of said wheel, an electro-magnet for drawing said finger out of said notches, a switch, and an electric circuit connecting the switch to said electro-magnet.

2. In a device for producing images on a screen, slide-carrying means, mechanism coöperating with said slide-carrying means for driving same, said mechanism including a wheel having a notched periphery, means for rotatively driving said wheel, a finger adapted to ride upon the periphery of the wheel and to move into said notches thereof, said finger being adapted to arrest the rotation of said wheel when located in said notches, an electro-magnet, a movable plunger operated by said electro-magnet, said plunger being adapted to strike said finger for withdrawing said finger from the notches of said wheel, a switch, and an electric circuit connecting the switch to said electro-magnet.

3. In a device for producing images on a screen, slide-carrying means, mechanism coöperating with said slide-carrying means for operating same, said mechanism including a wheel having a notched periphery, means for rotatively driving said wheel, a finger adapted to ride upon the periphery of the wheel and to move into said notches thereof, said finger being carried on a pivotally-mounted arm, and said finger being adapted to arrest the rotation of said wheel when said finger is located in said notches thereof, an electro-magnet, a movable plunger operated by said electro-magnet, said movable plunger being adapted to coöperate with said finger for withdrawing said finger from the notches of said wheel, a switch and an electric circuit connecting the switch to said electro-magnet.

4. In a device for producing images on a screen, slide-carrying means, mechanism coöperating with said slide-carrying means for operating same, said mechanism including a wheel having a notched periphery, means for rotatively driving said wheel, a finger adapted to ride upon the periphery of said wheel and to move into said notches thereof, said finger being adapted to arrest the rotation of said wheel when said finger is located in said notches thereof, and means operable at the will of an operator for withdrawing said finger from the notches of said wheel.

5. In a device for producing images on a screen, the combination of light-producing means, focusing means for the rays of said light-producing means, slide-carrying means for successively interposing slides in the path of said light rays that pass through said focusing means, mechanism coöperating with said slide-carrying means for operating same, said mechanism also controlling said light-producing means, and said mechanism including means operable at the will of an operator for causing said mechanism to operate said slide-carrying means and for simultaneously causing said mechanism to extinguish the light of said light-producing means.

6. In a device for producing images on a screen, slide-carrying means, mechanism coöperating with said slide-carrying means for operating same, said mechanism including gearing, a brake for arresting the rotation of said gearing, means for rotatively driving said gearing, the last said means coöperating with said gearing through a movably mounted gear, said movably mounted gear being adapted to kick itself out of mesh with said gearing, and means for simultaneously releasing the brake action of said braking means and for moving said movably mounted gear into mesh with said gearing.

7. In combination, slide-carrying means, a worm gear wheel operatably connected to said slide-carrying means, a worm shaft having a worm, means to drive the worm shaft, and electrically operated means to relatively move the worm gear wheel and worm alternatively into and out of engagement with one another.

8. In a device for producing images on a screen, slide-carrying means, mechanism coöperating with said slide-carrying means for operating same, said mechanism including a wheel having a notched periphery, a finger adapted to move into the notches of said wheel so as to arrest the rotation of said wheel, means for withdrawing said finger from the notches of said wheel, gearing for driving said wheel, and driving means for driving said gearing, said driving means coöperating with said gearing through a worm gear mounted on a movable shaft.

9. In a device for producing images on a screen, slide-carrying means, mechanism coöperating with said slide-carrying means for operating same, said mechanism including a wheel having a notched periphery, a finger adapted to move into the notches of said wheel for arresting the rotation of said wheel, gearing for driving said wheel, driving means for driving said gearing, said driving means coöperating with said gearing through a worm gear on a movably mounted shaft, and means for simultaneously withdrawing said finger from the notches of said wheel and for moving said shaft so that said worm gear meshes with said gearing.

10. In a device for producing images on a screen, slide-carrying means, mechanism coöperating with said slide-carrying means for operating same, said mechanism including a wheel having a notched periphery, a finger adapted to ride on the periphery of said wheel and to move into the notches thereof, said finger being adapted to arrest the rotation of said wheel when said finger is located in said notches thereof, means for driving said wheel, the last said means including an electric motor, an electric circuit for said motor and switch in said circuit; means for withdrawing said fingers from the notches of said wheel and for causing said finger to ride on the periphery of said wheel, means operatively connecting said finger with said switch, so that said electric circuit is closed for operating said motor when said finger rides upon the periphery of said wheel.

11. In a device for producing images on a screen, slide-carrying means, mechanism coöperating with said slide-carrying means for operating same, said mechanism including a wheel having a notched periphery, a finger adapted to ride on the periphery of said wheel and to move into the notches thereof, said finger being adapted to arrest the rotation of said wheel when said finger is located in said notches thereof; gearing for driving said wheel, a movably mounted electric motor for driving said gearing, said motor coöperating with said gearing through a gear on the motor shaft, said gear on the motor shaft being adapted to kick itself out of mesh with the aforesaid gearing; an electric circuit for said motor, a switch in said electric circuit; means operable at the will of an operator for withdrawing said finger from the notches of said wheel and for causing said finger to ride upon the periphery of said wheel, means operatively connected with said finger for simultaneously closing said switch in said electric circuit and for retaining said gear on the motor shaft in mesh with the aforesaid gearing.

12. In a device for producing images on a screen, the combination of light-producing means, focusing means for the rays of said light-producing means, slide-carrying means for successively interposing slides in the path of said light rays that pass through said focusing means, mechanism coöperating with said slide-carrying means for operating same, said mechanism including a wheel having a notched periphery, means for rotatively driving said wheel, a finger adapted to move into the notches of said wheel, said finger being adapted to arrest the rotation of said wheel when said finger is located in said notches thereof; an electric circuit for said light-producing means, a switch in said electric circuit, and means operable at the will of an operator for withdrawing said finger from the notches of said wheel and for simultaneously opening the switch in said electric circuit so that the light in said light-producing means is extinguished.

13. In a device for producing images on a screen, slide-carrying means, mechanism, coöperating with said slide-carrying means for operating same, said mechanism including a wheel having a notched periphery, a finger adapted to move into the notches of said wheel so as to arrest the rotation of said wheel, means for withdrawing said finger from the notches of said wheel, gearing for driving said wheel, and driving means for driving said gearing, said driving means coöperating with said gearing through a worm gear having substantially V-shaped threads, said worm gear being mounted on a movable shaft.

14. In combination, a drum provided with peripherally arranged slide-holders, light producing means inside of the drum, a switch to control said light producing means, means to turn the drum and means operatable by said drum turning means to switch the light on and off alternatively.

In testimony whereof, we have hereunto set our hands at Los Angeles, California, this 27th day of March, 1913.

HAROLD S. GAY.
ELZA W. DUKE.

In presence of—
JAMES R. TOWNSEND,
ROBERT A. STEPS.